United States Patent [19]

Harman et al.

[11] 3,779,110

[45] Dec. 18, 1973

[54] LATHES WITH CHUCK TRANSFER MECHANISM

[75] Inventors: Julius Harman, Baginton; Michael Eric Norman, Holly Croft, both of England

[73] Assignee: Alfred Herbert Limited, Coventry, England

[22] Filed: Apr. 8, 1971

[21] Appl. No.: 132,523

[30] Foreign Application Priority Data
Apr. 10, 1970   Great Britain.................. 17,118/70

[52] U.S. Cl..................................... 82/2.5, 29/568
[51] Int. Cl............................................. B23b 13/02
[58] Field of Search .................. 82/2.5, 2.7; 29/568

[56] References Cited
UNITED STATES PATENTS
3,550,487   12/1970   Randall et al..................... 82/2.7 X

*Primary Examiner*—Leonidas Vlachos
*Attorney*—Holman & Stern

[57] ABSTRACT

A lathe is provided with a chuck transfer mechanism which includes a head having a circular opening to receive a chuck for transfer. For holding the chuck in the opening there is a plurality of fluid actuated plunger devices around the opening with the devices interconnected to permit displacement of fluid from one device to another. This allows transverse movement of the chuck relative to the head to allow a toothed locating device on the chuck to align itself accurately with a complementary toothed locating device on the work spindle.

13 Claims, 6 Drawing Figures

INVENTOR
Julius Harman & Michael Eric Norman

ATTORNEYS

LATHES WITH CHUCK TRANSFER MECHANISM

This invention relates to a lathe with a chuck transfer mechanism and has as an object to provide such a lathe in a convenient form.

A lathe in accordance with the invention comprises a frame a headstock spindle carried by the frame, means for movably carrying a tool on said frame for operating on a workpiece carried in a chuck on the spindle, a dummy spindle on the frame on which a chuck can be set up prior to transfer to the headstock spindle, a toothed coupling device on the headstock spindle constituting the sole means for locating a chuck having a complementary toothed coupling device on the spindle in a unique axial and transverse position and a unique angular orientation relative thereto drawing means on the spindle for co-acting with complementary means on a chuck for drawing the latter towards the spindle to interengage the toothed coupling device on the spindle with that on the chuck, a chuck transfer head movably mounted on the frame for transferring a chuck from the dummy spindle to the headstock spindle and holding means on said head for retaining a chuck thereon during transfer and permitting slight radial movement of a chuck held thereby relative to said head during drawing of such chuck towards the spindle by said drawing means.

Figure 1:
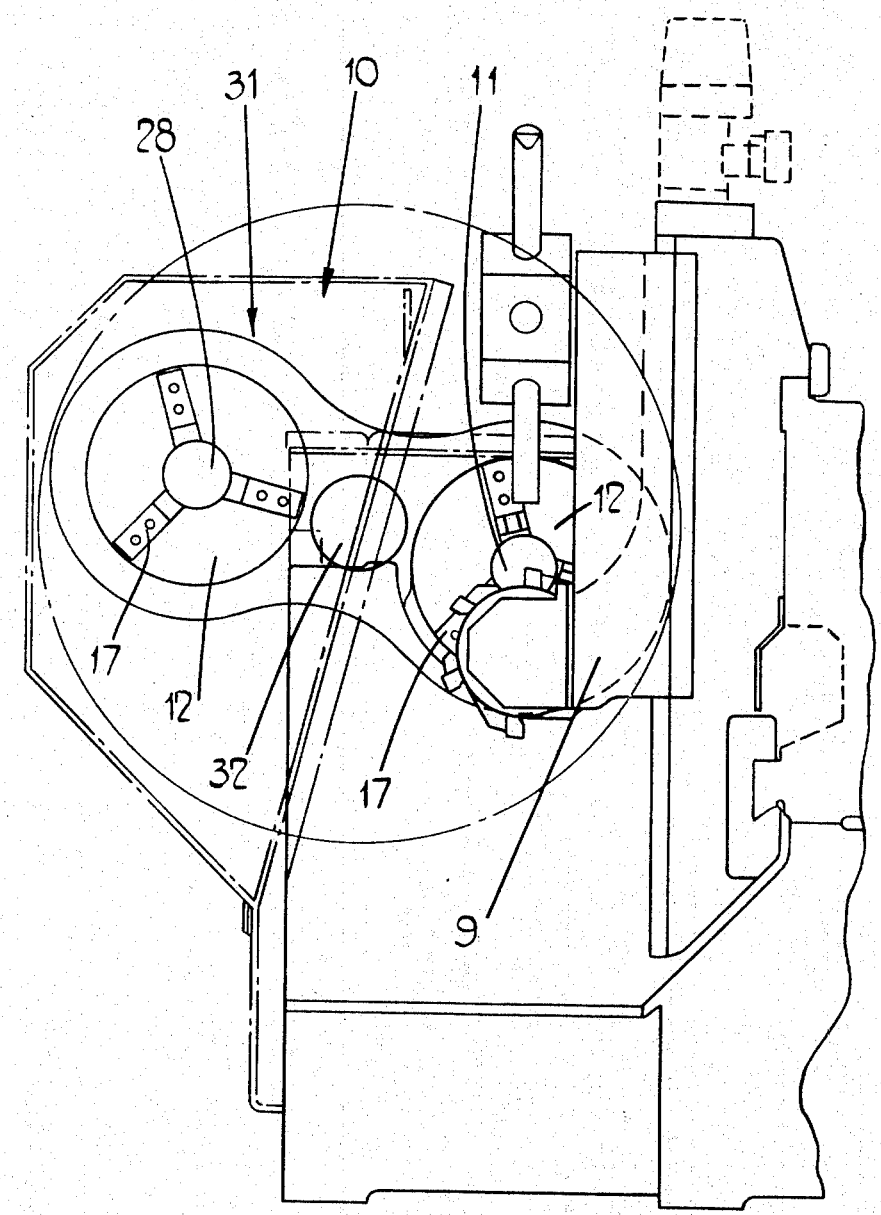
Figure 2:
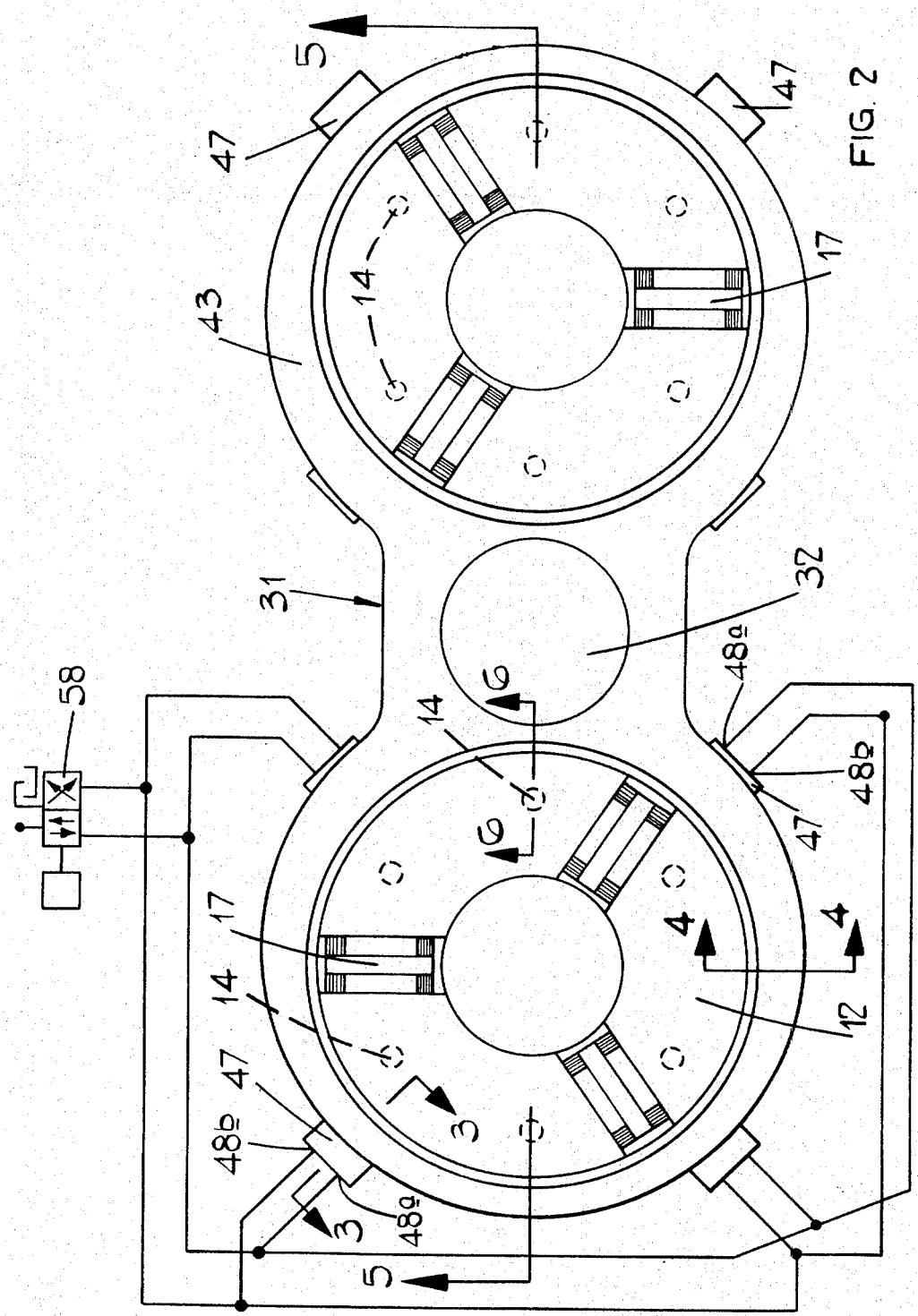
Figure 3:
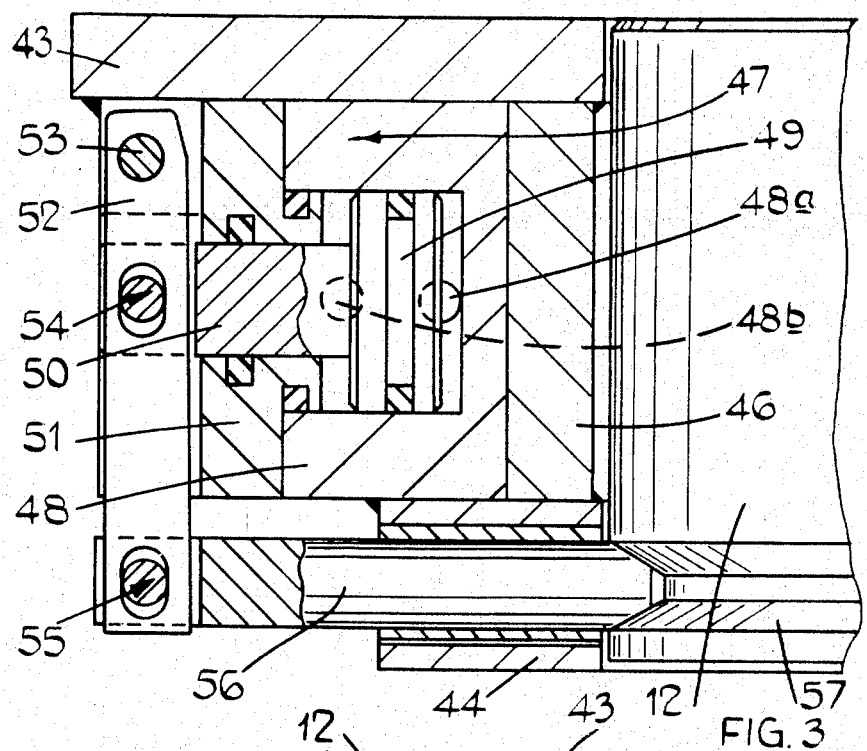
Figure 4:
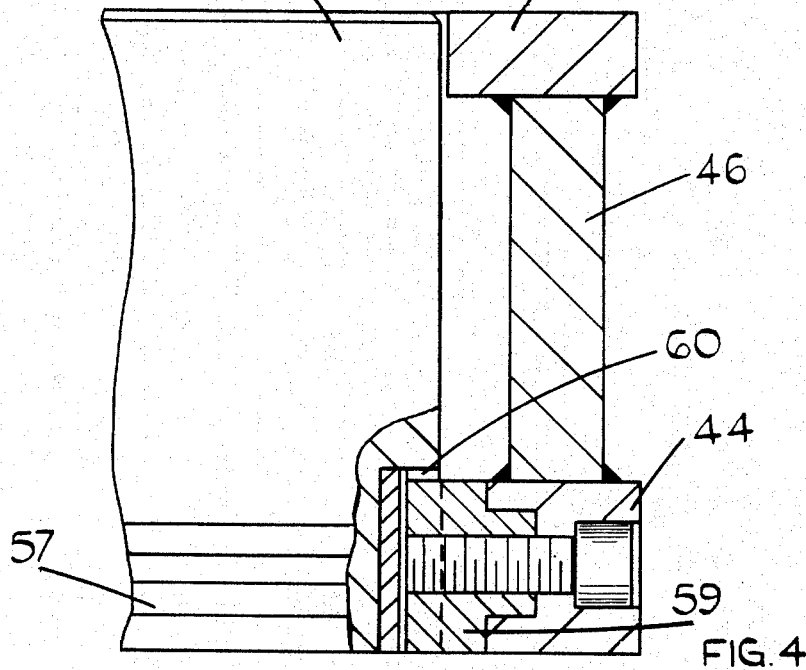
Figure 5:
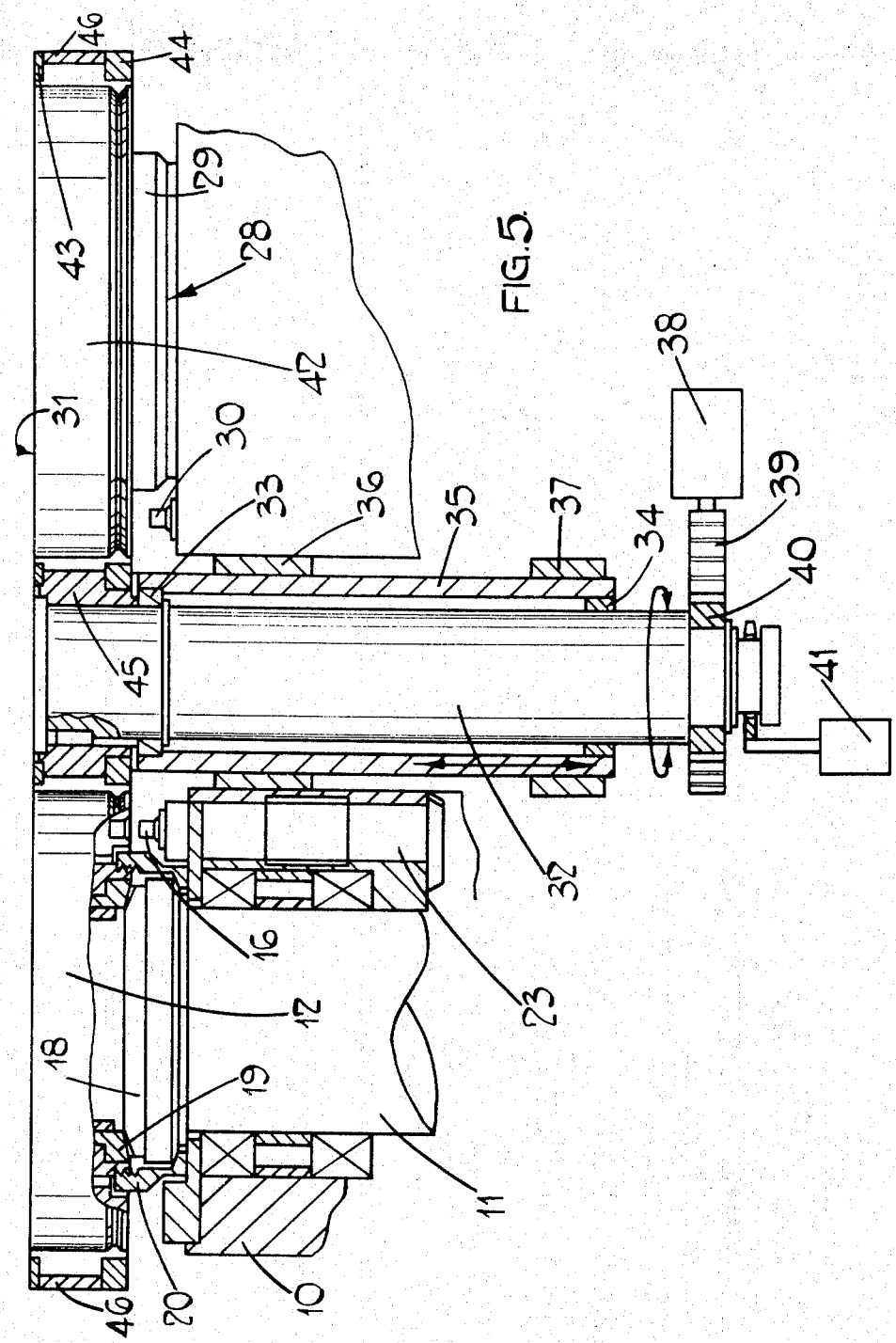
Figure 6:
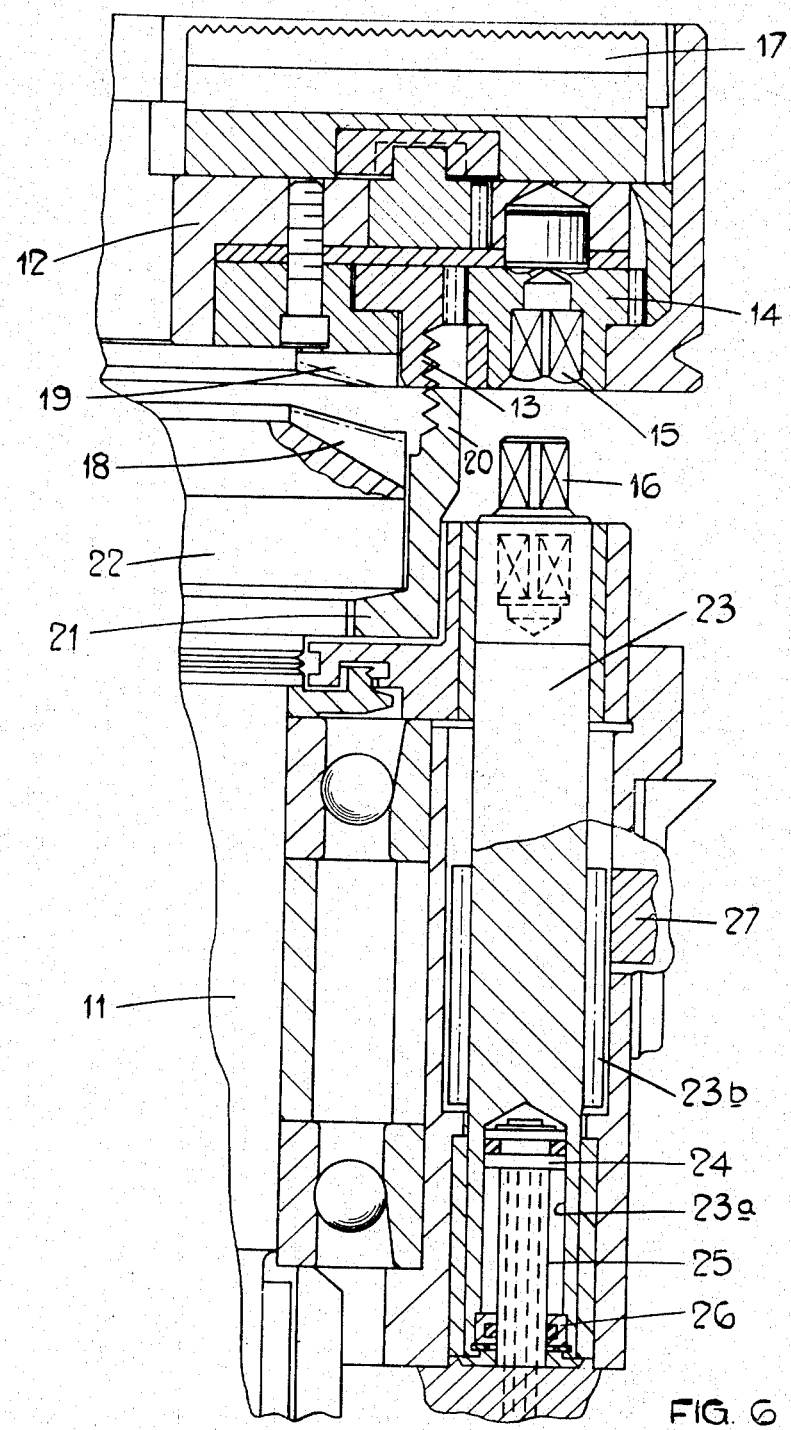

An example of the invention is illustrated in the accompanying drawings in which:

FIG. 1 is an end elevation of the lathe,

FIG. 2 is a fragmentary elevation of the lathe headstock showing a chuck transfer head, FIG. 3 is an enlarged fragmentary section on line 3—3 in FIG. 2, FIG. 4 is an enlarged fragmentary section on line 4—4 in FIG. 2, FIG. 5 is a section on line 5—5 in FIG. 2 with parts omitted, and FIG. 6 is an enlarged fragmentary section on line 6—6 in FIG. 2.

The lathe shown in the drawings has a frame which includes a headstock 10 carrying a headstock spindle 11. The spindle is provided with a variable speed power drive (not shown) and the frame of the lathe also supports a power driven tool carrying slid/saddle arrangement 9 for carrying tools for operating upon a workpiece carried by a chuck 12 on the headstock spindle 11.

The chuck 12 forms the subject of British Patent Application No: 50583/69 and includes an externally screw threaded sleeve 13 rotatably mounted at the rear of the chuck. The sleeve 13 has gear teeth which mesh with three gears 14 equi-angularly spaced around the sleeve 13 and each provided with a square section socket 15. The screw-threaded sleeve 13 can therefore be rotated by a key 16 inserted into the back of the chuck at any one of three positions. As will be evident from Application No: 50583/69 the same key 16 is used for adjusting the jaws 17 of the chuck.

For accurately locating the chuck 12 on the spindle 11, the end of the spindle is provided with a toothed coupling device 18 which has an annular array of axially projecting teeth with inclined flanks. A complementary ring 19 is provided on the chuck and these rings 18, 19 are designed in known manner to cause the ring 19 (and hence the chuck 12) to take up an exactly predetermined position relative to the ring 18 (and hence to the spindle 11) when the two rings are drawn together. The chuck 12 is thus accurately located axially and transversely in a precise position and orientated in a precise angular orientation relative to the spindle by the rings 18, 19 alone.

FOr coacting with the screw threaded sleeve 13, there is a captive nut 20 on the spindle. As shown this nut 20 has an inturned flange 21 at one end, which is captive behind a flange 22, on the spindle 11. A key (not shown) ensures that the nut 20 turns with the spindle 11, but the nut is allowed a small amount of freedom of movement radially, thereby ensuring that the proper operation of the toothed coupling rings 18, 19 is not interfered with.

The key 16 is mounted on the end of a stepped cylindrical member 23, the opposite end of which has a blind bore 23a which receives a piston 24 on a stem 25 passing through a sealing end piece 26 fitted to the member 23. The stem 25 has two drillings extending along its length, which drillings open into the bore 23a on opposite sides of the piston 24 respectively. This enables pressurised fluid to be introduced into the bore 23a above the piston 24 (as viewed in FIG. 6) to advance the key 16 into driving engagement with the gear 15 or into the bore 23a below the piston 24 to withdraw the key 16. The member 23 is provided, on a portion intermediate its ends with gear teeth 23b of sufficient axial length to mesh with a driving gear 27 over the whole of the stroke of the member 23. The driving gear 27 is hydraulically or electrically driven or is provided with a mechanical driving connection, including a clutch, to the headstock spindle drive motor.

Also mounted on the headstock or on a part of the frame joined to the headstock, is a dummy spindle 28 which has its own toothed coupling device (not shown) identical to the device 18, its own nut 29 identical to the nut 20, and its own key 30 identical to the key 16. The toothed coupling device of the dummy spindle 28 is set slightly further back than that on the spindle 11 for the reason which is given hereinafter.

For transferring chucks between the headstock spindle 11 and the dummy spindle 28, there is provided a chuck transfer head 31. This head 31 is mounted on a shaft 32 which is rotatably carried by bearings 33, 34 in a tubular member 35. The tubular member 35 is axially slidable in bearings 36, 37 in the headstock but is prevented from rotating by a suitable key (not shown). Means are provided for turning the shaft 32 through 180° between two limiting positions and for displacing the shaft 32 and the tubular member 35 axially. As shown diagrammatically in FIG. 5, an hydraulic cylinder unit 38 is provided for the former task which it accomplishes by means of a rack 39 on the piston rod of the unit 38 co-acting with a pinion 40 on the shaft 32 and an hydraulic cylinder unit 41 coupled to the shaft 32 is provided for the latter task.

The head 31 is generally of a figure eight configuration and has two openings into which a pair of chucks 12, 42 on the headstock spindle 11 and the dummy spindle 28 are received. In fact, the head consists of two plates 43, 44 cut to the figure eight configuration, a hub 45 joining the plates together and to the shaft 32 and a frame 46 also joining the plates 43, 44 together.

The openings in the plates 43, 44 are somewhat larger than the external diameters of the chucks 12, 42. For holding the chucks in the openings in the head each opening has associated with it a plurality (in this case four) of hydraulic piston and cylinder units 47. These are arranged at 90° intervals around the axis of the opening. As shown in FIG. 3 each unit 47 comprises a cylinder 48, a piston 49 in the cylinder and having a piston rod 50 projecting through an annular end cover 51 on the cylinder. The piston rod 50 projects radially outwards with respect to the axis of the associated opening in the head 31. The end cover 51 is formed with a transverse groove in which there is dispersed a lever 52 pivoted at one end to the end cover 51 on a pin 53. There is a pin and slot connection 54 between the piston rod 50 and the lever 52 and a further pin and slot connection 55 connects the opposite end of the lever 52 to a plunger 56 slidably mounted in a radial bore in the plate 44. The inner end of this plunger is tapered to fit into a V-groove 57 machined in the periphery of each chuck 12 or 42. Each cylinder 48 has two ports 48a and 48b respectively arranged so that supplying pressurised fluid to the ports 48a causes inward movement, of the plungers and supplying pressurised fluid to the ports 48b causes outward movement of the plungers 56.

As shown diagrammatically in FIG. 2 all the ports 48a associated with one opening in the head 31 are connected together and to one port of a reversing valve 58 and all the ports 48b associated with the same opening are connected together and to another port of the valve 58. A separate valve (not shown) is used for the piston and cylinder units associated with the other opening.

The valve 58 thus causes all of the plungers associated with one opening to be moved inwards or outwards simultaneously. Moreover it will be evident that when a chuck in one of the openings is gripped by the plungers 56 it will be incapable of axial movement relative to the head, but it will be permitted slight movement relative thereto in radial directions, fluid being transferred from one or two of the cylinders 47 to the others. Thus interference with the proper action of the toothed locating devices is prevented.

Turning of a chuck within an opening in the head 31 is prevented by a key 59 (see FIG. 4) secured to the plate 44 and fitted into notch 60 machined in the periphery of the chuck.

A chuck transfer operation may be regarded as commencing when a chuck 42 on the dummy spindle 28 is set up ready for transfer and the machining operation on a workpiece carried by a chuck 12 on the headstock spindle 12 is complete. Both spindles are then brought to rest so that the notches 60 are aligned with the keys 59. During the machining and set-up operations the head 31 occupies a parked position with the head displaced axially towards the headstock sufficiently to ensure that the keys 59 do not interfere with the chucks 12, 42. At the commencement of the chuck transfer operation, the head 31 is first moved axially to engage the keys 59 with the notches 60 in the chucks and to align the plungers 56 with the groove 57 in the chuck 42 on the dummy spindle. The plungers 56 are then driven into this groove and operation of a pressure switch signals completion of this manoevre. The key 30 is now advanced to engage in the socket 15 of the chuck 42 and the head 31 is then freed from axial constraint by the unit 41 (e.g. by interconnecting the ends of its cylinder or by connecting both ends to drain pressure).

Driving of key 30 causing turning of the screw threaded sleeve 13 of the chuck 42 and the chuck 42 is moved axially until the sleeve 13 becomes disengaged from the nut 20. The head is then advanced further axially, carrying the chuck 42 with it to a position in which the plungers 56 of the opening around the chuck 12 are aligned with the groove 57 in the chuck 12. The above procedure is then repeated to release the chuck 12 and finally to displace both chucks to interchange positions.

The head is then turned through 180° to interchange the chucks and a reverse procedure is followed. Thus the head 31 is first moved axially until the sleeve 13 of chuck 42 engages the nut 20 of the headstock spindle 11. The key 16 is then engaged and driven whilst the head 31 is freed to draw the chuck 42 into its proper position on the spindle 11. The head 31 is then moved axially again to engage the sleeve 13 of the chuck 12 with the nut 29 of the dummy spindle 28, and the key 30 is engaged and driven to seat the chuck 12 on the dummy spindle 28. Finally the head 31 is returned to its parked position and operation on the new workpiece on the headstock spindle and on the chuck 12 can commence.

In an alternative form of the invention the dummy spindle is not set back from the headstock spindle but is free to move axially against resilient biasing means. In this case the sequence of operation is simplified since both nuts 20 and 29 are driven simultaneously axial displacement of the head 31 being determined by the headstock spindle chuck mounting arrangement only.

We claim:

1. A lathe comprising a frame; a headstock spindle carried by the frame; means for movably carrying a tool on said frame for operating on a workpiece carried in a chuck on the spindle; a dummy spindle on the frame on which a chuck can be set up prior to transfer to the headstock spindle; a toothed coupling device on the headstock spindle constituting the sole means for locating a chuck having a complementary toothed coupling device on the spindle in a unique axial and transverse position and a unique angular orientation relative thereto; drawing means on the spindle for co-acting with complementary means on a chuck for drawing the latter towards the spindle to interengage the toothed coupling device on the spindle with that on the chuck; a chuck transfer head movably mounted on the frame for transferring a chuck from the dummy spindle to the headstock spindle; holding means on said head for retaining a chuck thereon during transfer and permitting slight radial movement of a chuck held thereby relative to said head during drawing of such chuck towards the spindle by said drawing means, said holding means comprising a plurality of plungers arranged around an opening in the head which receives with radial clearance a chuck for transfer, only said plungers engaging the chuck, and a plurality of fluid-operated units operatively connected to the respective plungers for inward and outward displacement of the latter, the fluid-operated units being interconnected so that radial movement of the chuck causes displacement of fluid from one unit to another.

2. The lathe as claimed in claim 1 in which each plunger is connected to a piston rod of its associated fluid operated unit by a motion magnifying lever.

3. The lathe as claimed in claim 2 in which said head has a pair of openings for simultaneously receiving a pair of chucks.

4. The lathe as claimed in claim 3 in which the dummy spindle is spaced from and parallel to, the headstock spindle and the head is angularly movable about an axis parallel to and equally spaced from, the headstock spindle, and the dummy spindle.

5. The lathe as claimed in claim 4 in which there is a further toothed coupling device on the dummy spindle arranged in a plane spaced from the plane of the toothed coupling device of the headstock spindle such that when the head occupies a position with a chuck retained in one opening having its toothed coupling device engaged with the toothed coupling device on the headstock spindles the toothed coupling device of a chuck in the other opening is axially spaced from said further toothed coupling device.

6. The lathe as claimed in claim 5 including further drawing means on said dummy spindle for drawing a chuck towards said dummy spindle to interengage said further toothed coupling device with the toothed coupling device of the chuck.

7. The lathe as claimed in claim 1 including a key secured to the head and arranged to fit in a notch in the periphery of a chuck held by the head to prevent turning of the chuck relative to the head.

8. The lathe as claimed in claim 1 in which said drawing means includes a screw-threaded sleeve mounted on the headstock spindle for rotation therewith and means for imparting relative rotation to a complementarily screw threaded sleeve rotatably mounted on a chuck to be mounted on the headstock spindle.

9. The lathe as claimed in claim 8 in which said rotation imparting means comprises a rotatable key adapted to be received by a socket in a gear rotatably mounted on the chuck and meshed with gear teeth on said complementarily screw threaded sleeve.

10. The lathe as claimed in claim 9 in which said key is also displaceable in a direction parallel to the axis of the headstock spindle.

11. The lathe as claimed in claim 10 in which the key is mounted on a member slidably mounted on the frame and having elongated gear teeth, a fluid operated unit being provided for displacing said unit axially and a gear, connected by a clutch to drive means, engages said elongated gear teeth.

12. The lathe as claimed in claim 11 in which said fluid operated unit comprises a piston on a piston rod formed with longitudinal drillings opening on to apposite sides of said piston, said piston being slidably engaged in a bore in said member.

13. The lathe as claimed in claim 11 in which said drive means is also used for driving the headstock spindle.

* * * * *